L. M. POTTS.
SYSTEM OF TELEGRAPH DISTRIBUTION.
APPLICATION FILED FEB. 5, 1920.
1,419,409.
Patented June 13, 1922.
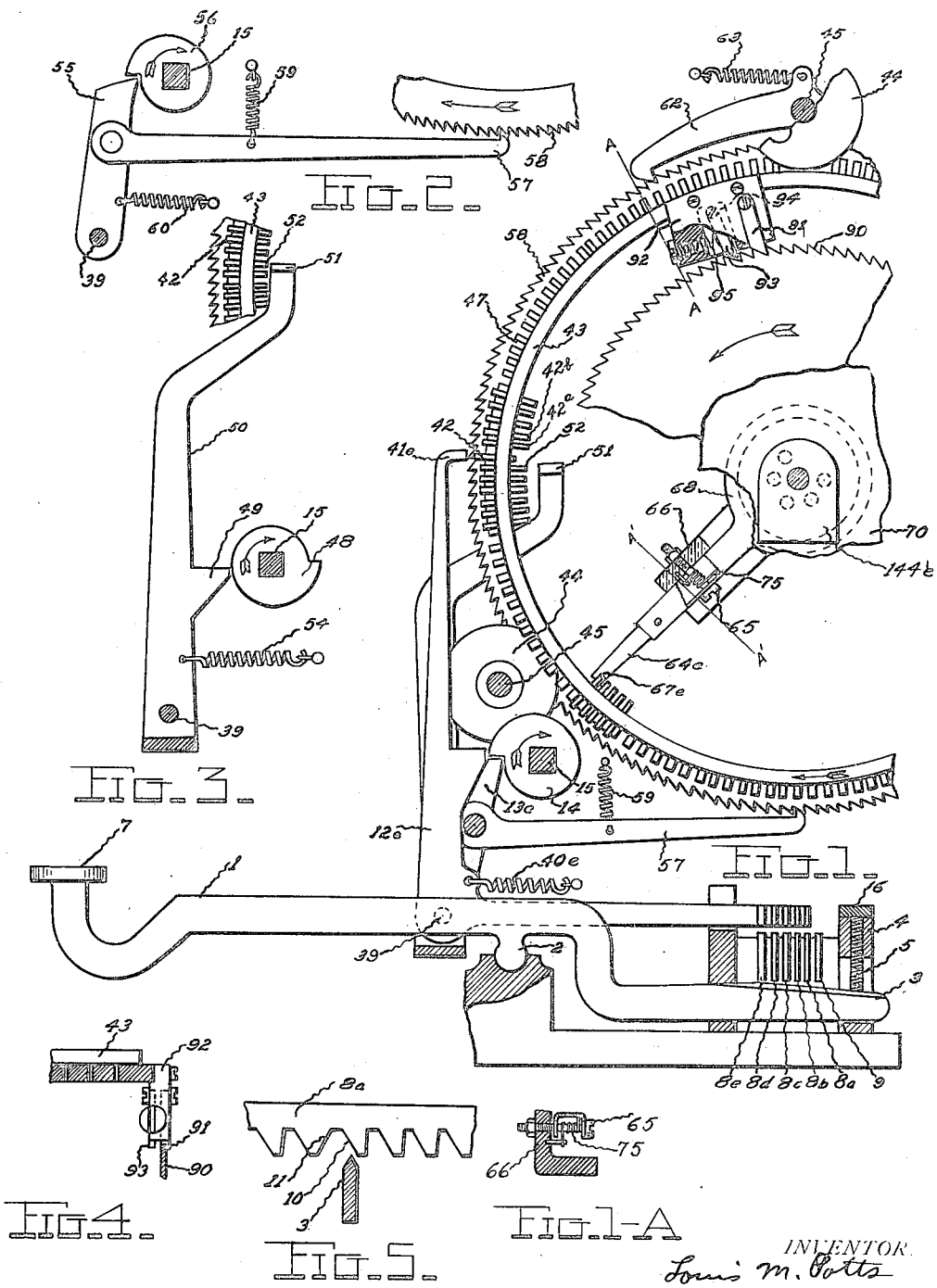

L. M. POTTS.
SYSTEM OF TELEGRAPH DISTRIBUTION.
APPLICATION FILED FEB. 5, 1920.
1,419,409.
Patented June 13, 1922.
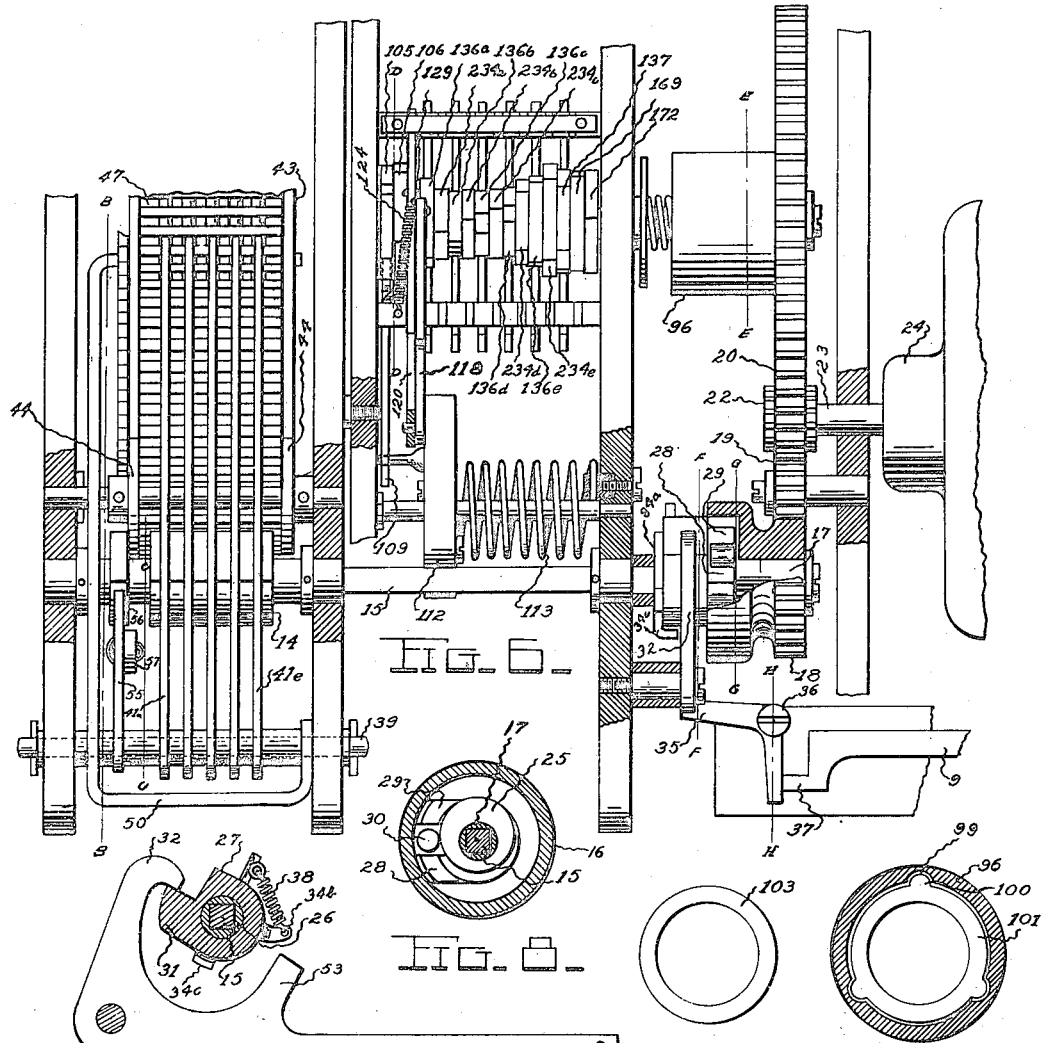
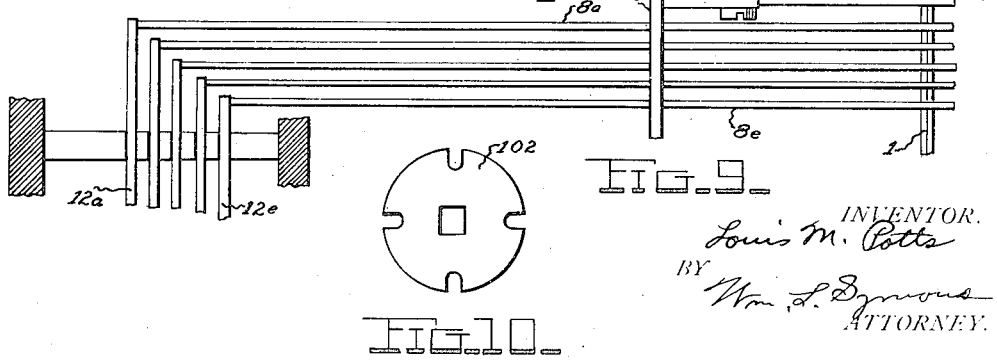

L. M. POTTS.
SYSTEM OF TELEGRAPH DISTRIBUTION.
APPLICATION FILED FEB. 5, 1920.
1,419,409.  Patented June 13, 1922.
9 SHEETS—SHEET 3.
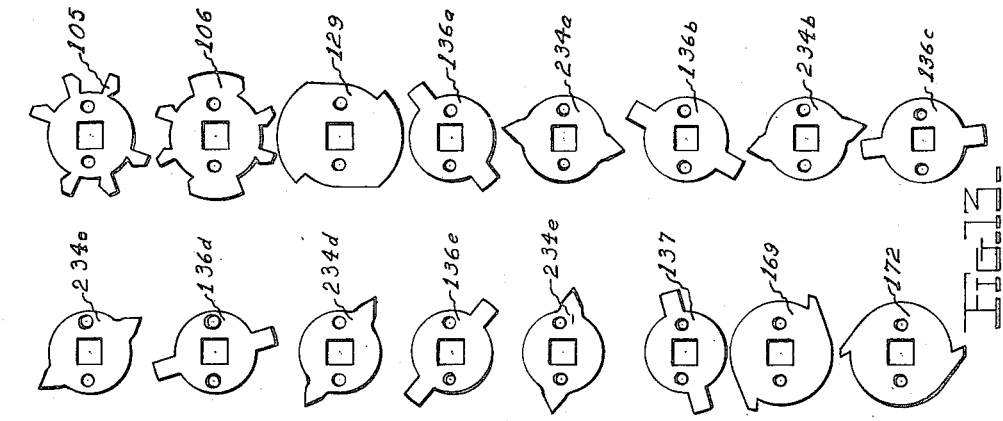
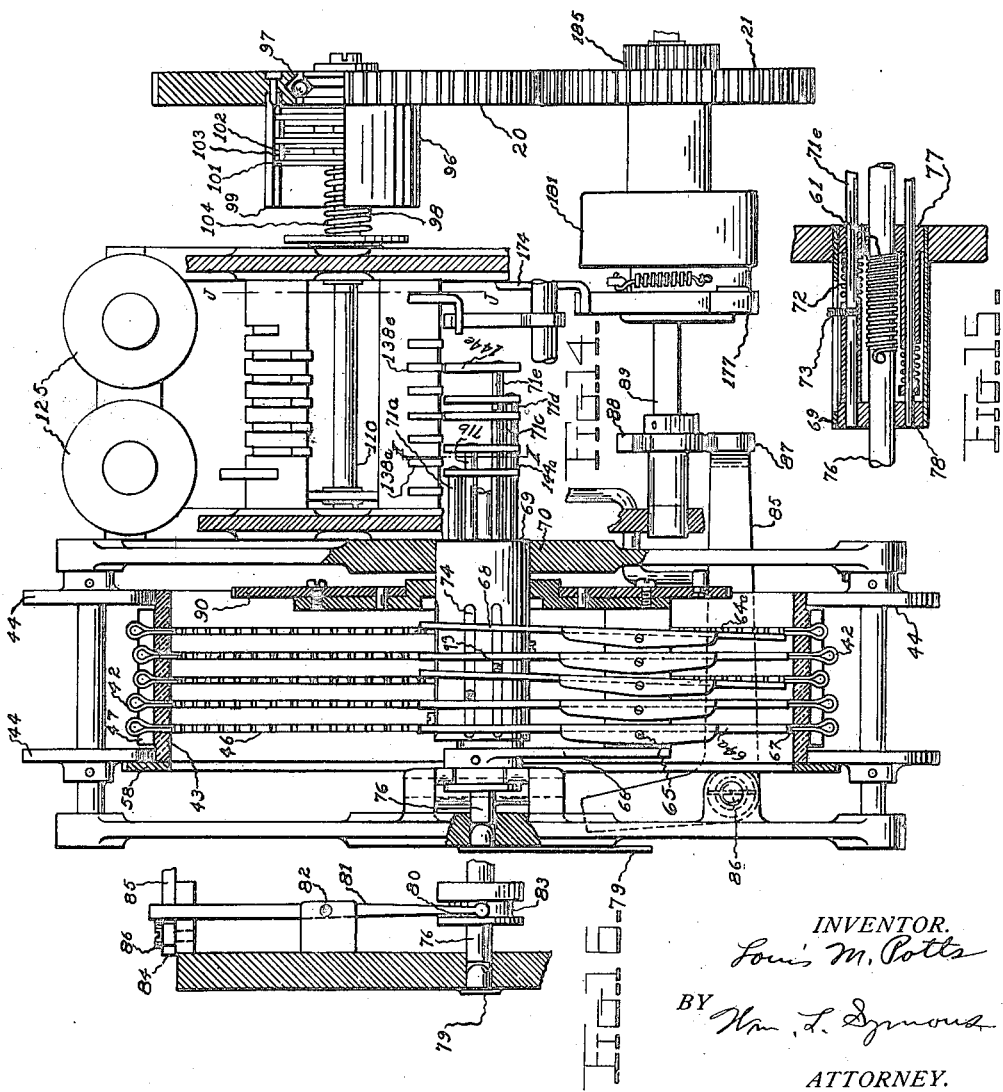
INVENTOR.
Louis M. Potts
BY Wm. L. Symons
ATTORNEY.

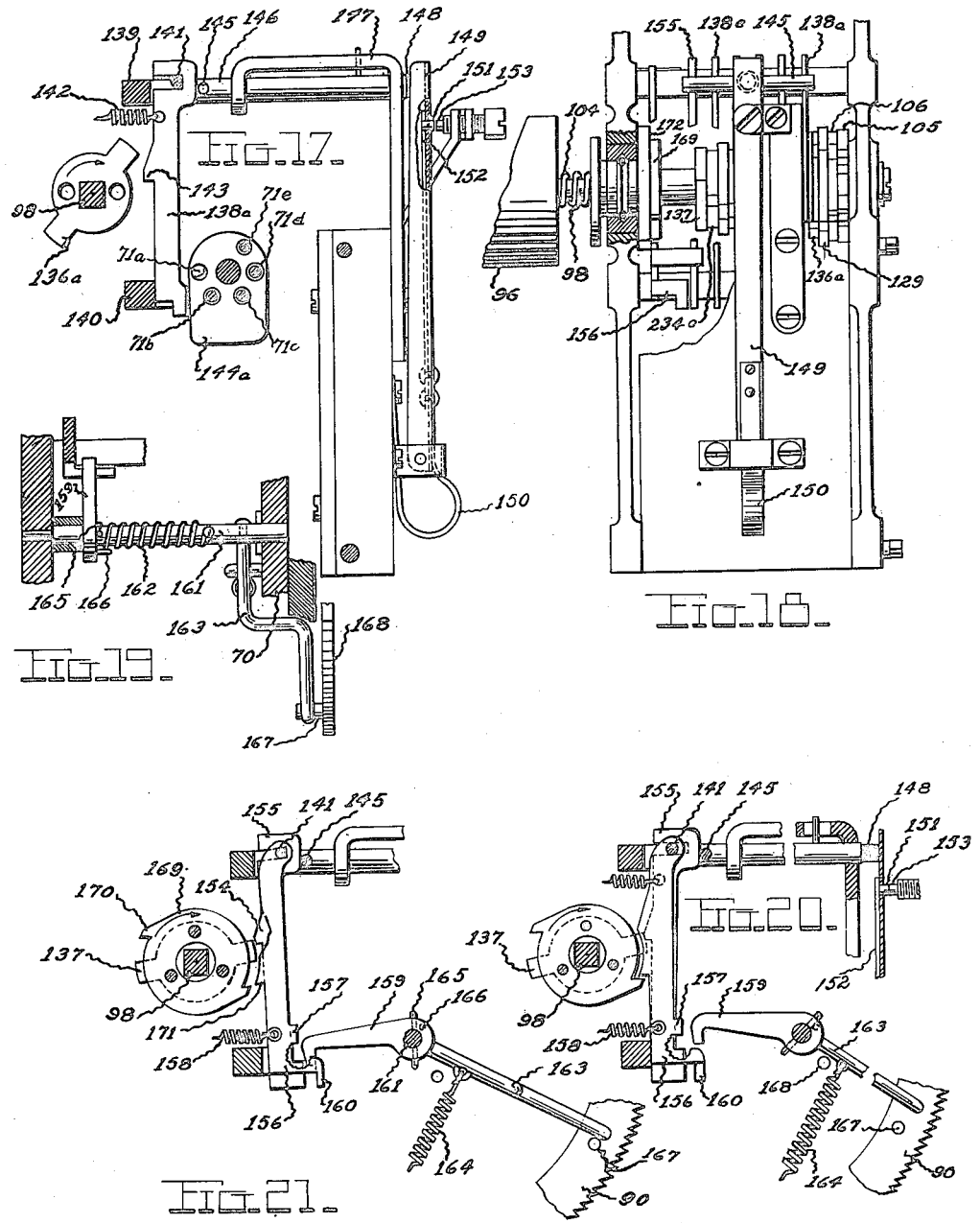

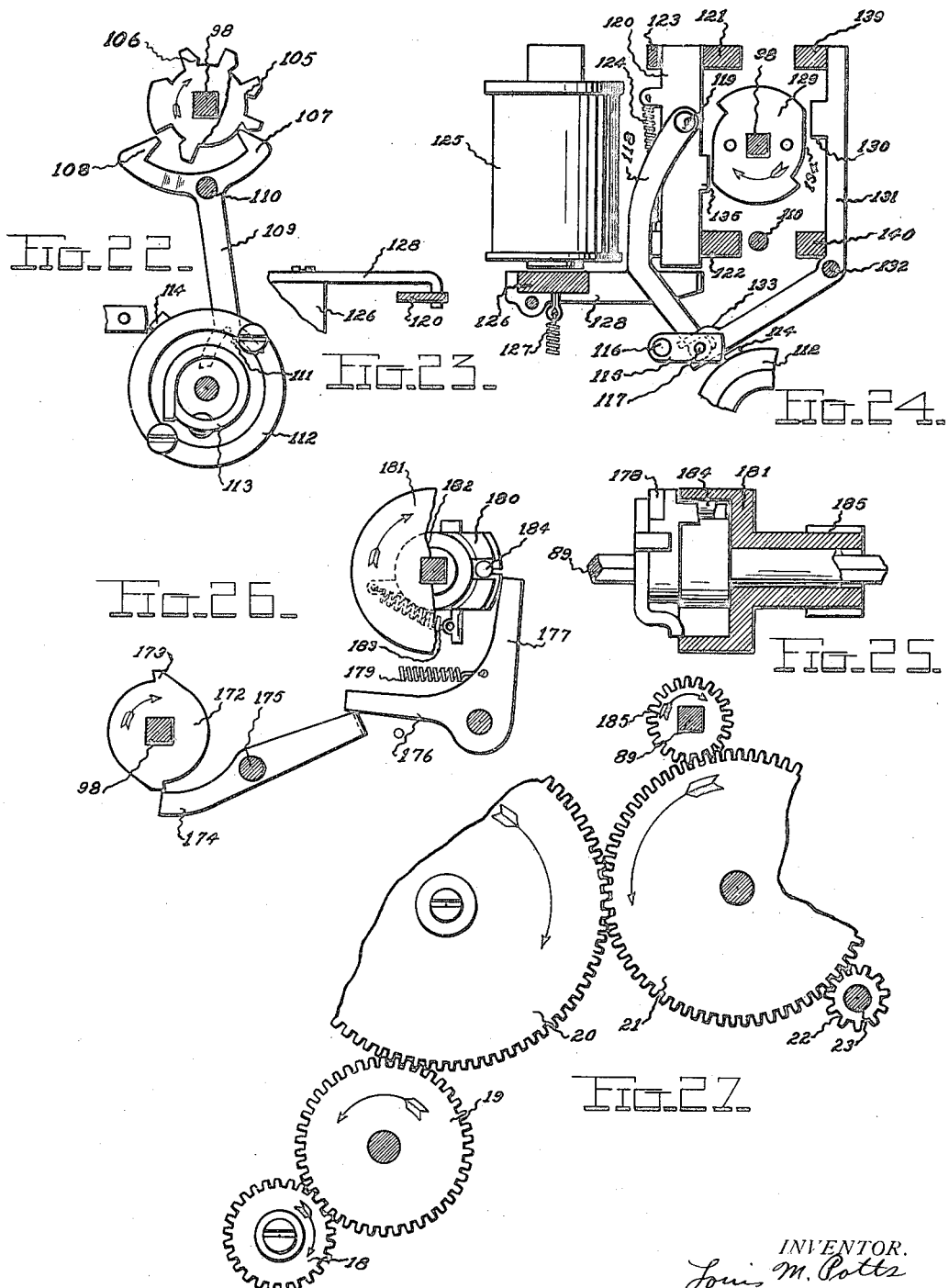

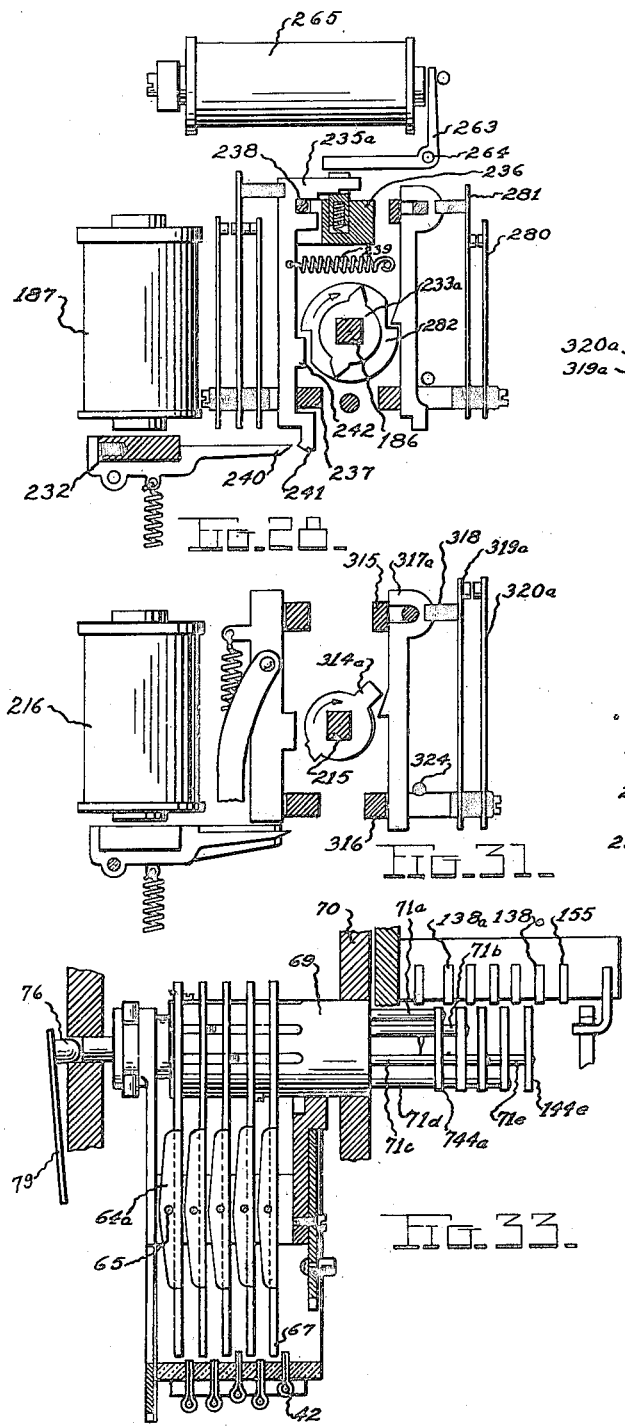# L. M. POTTS.
SYSTEM OF TELEGRAPH DISTRIBUTION.
APPLICATION FILED FEB. 5, 1920.
1,419,409.
Patented June 13, 1922.
9 SHEETS—SHEET 6.
INVENTOR.
Louis M. Potts
BY Wm. L. Symons
ATTORNEY.

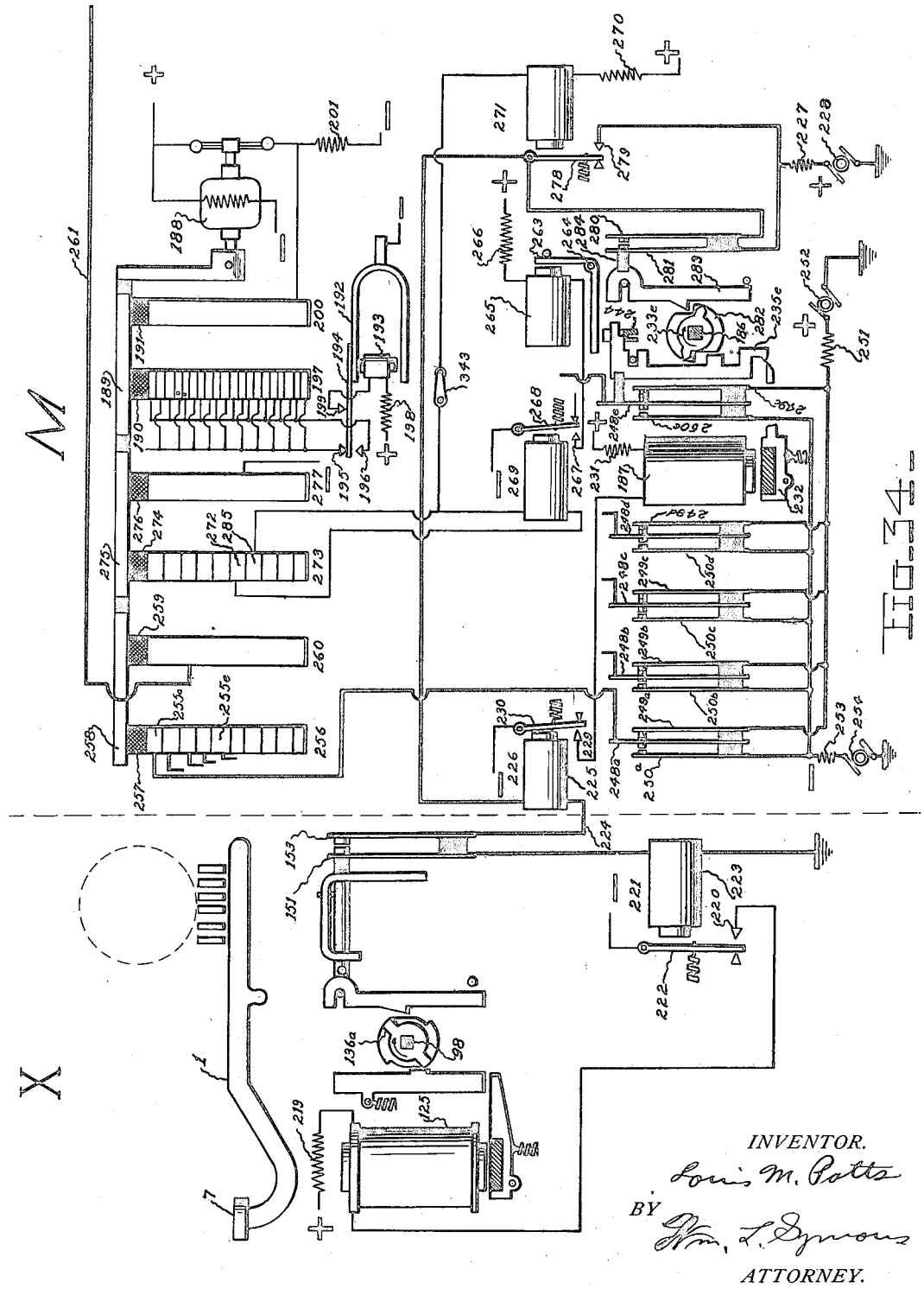

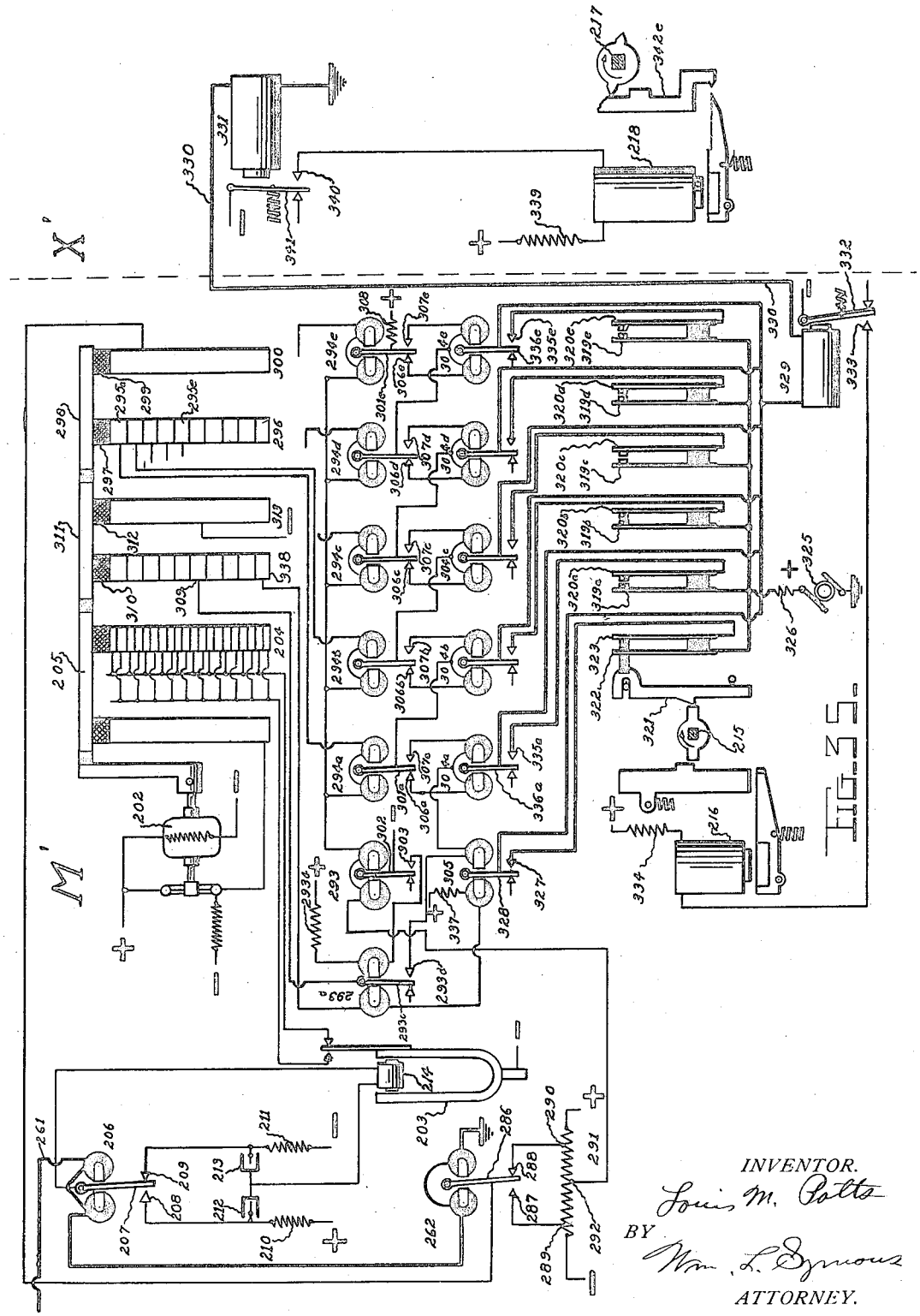

L. M. POTTS.
SYSTEM OF TELEGRAPH DISTRIBUTION.
APPLICATION FILED FEB. 5, 1920.
1,419,409.
Patented June 13, 1922.
9 SHEETS—SHEET 9.
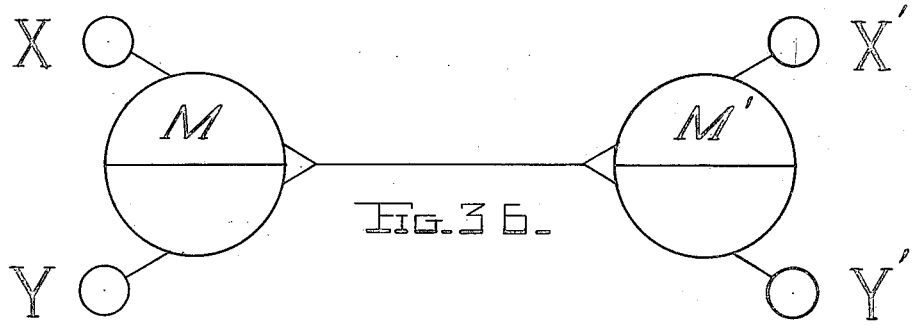
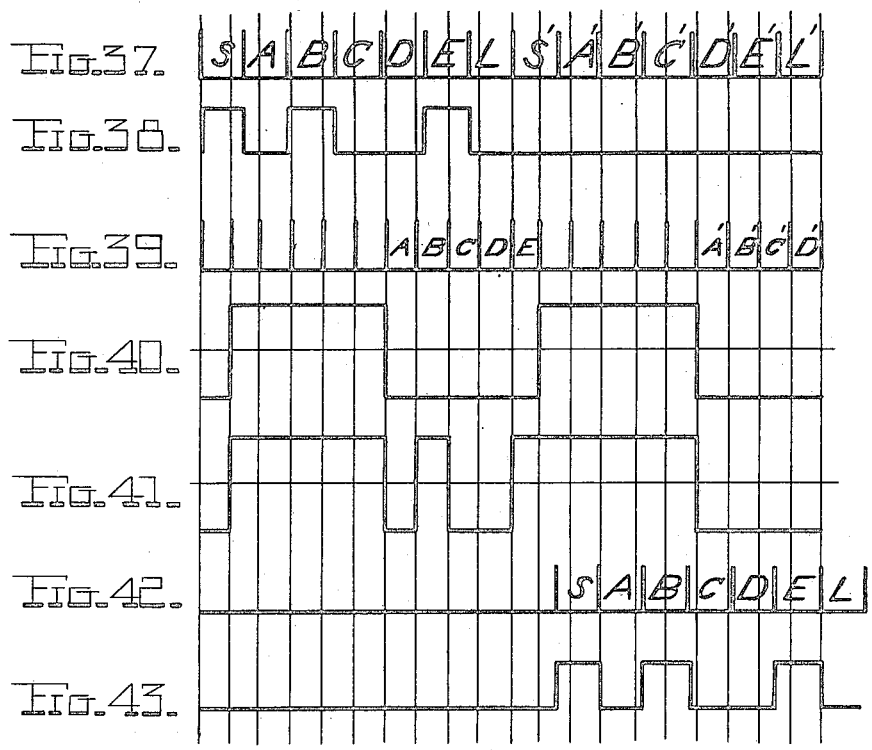
INVENTOR.
Louis M. Potts
BY
Wm. L. Symons
ATTORNEY.

UNITED STATES PATENT OFFICE.

LOUIS M. POTTS, OF BALTIMORE, MARYLAND, ASSIGNOR, BY MESNE ASSIGNMENTS, TO AMERICAN TELEPHONE AND TELEGRAPH COMPANY, OF NEW YORK, N. Y., A CORPORATION OF NEW YORK.

SYSTEM OF TELEGRAPH DISTRIBUTION.

1,419,409.     Specification of Letters Patent.   Patented June 13, 1922.

Application filed February 5, 1920. Serial No. 356,513.

*To all whom it may concern:*

Be it known that I, LOUIS M. POTTS, a citizen of the United States of America, residing at Baltimore, State of Maryland, have invented certain new and useful Improvements in Systems of Telegraph Distribution, of which the following is a specification.

In my copending application 286,540 I have described a similar system. The present system is an improvement in that it uses at the substations a metal storage device, an improved form of that described in my U. S. Patent No. 1,258,809, and also uses mechanical selecting device similar to that described in my U. S. Patents Nos. 1,229,201 and 1,229,202. By this method the system is more practical for use in offices when skilled attendants are not available, by not requiring perforating mechanism or tape. The mechanical nature of all the apparatus at the substation also makes possible maintenance by a system of inspection and repairs can be made by typewriter or adding machine repairmen. Due to the use of the metal storage at the substation and direct repeating from relays at central the lag between the depression of a key and the printing of the corresponding character at the substation may be approximately equal to the time interval of a single signal. This is a point of great importance in private wire service, especially for stock brokers.

This invention relates to improvements in systems of telegraph distribution and relates particularly to the use of a single trunk line by several subscribers for independent communication between selected pairs of stations. The invention contemplates operating the trunk line in multiplex by a synchronous method and operating the branch lines connecting the subscriber to the central office by a method not involving continuously synchronized apparatus. The apparatus described also includes novel methods of repeating and improved methods of operation, all of which will be more particularly described in the accompanying text and pointed out in the claims:

Attention is called to the fact that the line current is supplied to the branch line from the centrals irrespective of the direction of transmission. This is a point of considerable importance in a system of this kind since the substations may be located at points where skill is lacking for the maintenance of any apparatus not absolutely essential.

In describing my said invention reference will be made to the accompanying drawings in which—

Fig. 1 is a skeleton side elevation of the storing and transmitter controlling device at the substation.

Fig. 1$^A$ is a detail view of the pivot of the circuit controller arms.

Fig. 2 is a detail of the storage spacing device in section on line CC Fig. 6.

Fig. 3 is a detail of the storage restoring device in section on line BB Fig. 6.

Fig. 4 is a detail of the transmitter controlling element spacing pawls in section on line AA Fig. 1.

Fig. 5 shows a fragment of key lever and a slide bar.

Fig. 6 is a view partly in section showing the relation of certain parts in the storage device and transmitting device at the substation.

Fig. 7 shows the roller clutch control in section partly on line FF and partly on line HH Fig. 6.

Fig. 8 is a view of the roller clutch in section on line GG Fig. 6.

Fig. 9 is a view looking down and shows the relation of the combination bars in the keyboard and the storage setting levers.

Fig. 10 is a detail of the friction clutch.

Fig. 11 is a detail of the friction clutch.

Fig. 12 is a section of the friction clutch on line EE.

Fig. 13 shows the relation of the cams on the escapement shaft.

Fig. 14 is a skeleton view partly in section looking up from below of the storage device and transmitter mechanism.

Fig. 15 is a detail of the transmitter controlling device.

Fig. 16 is a view of part of the transmitter controlling element operating levers.

Fig. 17 shows the transmitting contacts and one operating element at the substation. The operating element is a section on line II Fig. 14.

Fig. 18 is a view of the contact and its operating mechanism at the substation.

Fig. 19 is a plan view of the start control from the storage member.

Fig. 20 is a view of the start control from the storage device, in the position occupied when signals are stored in section on line JJ Fig. 14.

Fig. 21 is similar to Fig. 20 when no signals are stored.

Fig. 22 shows the balance and escapement in section on line DD Fig. 6.

Fig. 23 is a fragmentary view from above of the start arm on the magnet armature.

Fig. 24 shows the balance start mechanism.

Fig. 25 shows the roller clutch which controls the spacing of the transmitter controlling member.

Fig. 26 shows the release mechanism for the roller clutch shown in Fig. 25.

Fig. 27 shows the gear train.

Fig. 28 shows a sectional view of the receiving selector at central.

Fig. 29 is a skeleton front view of the selector shown in Fig. 28.

Fig. 30 is a skeleton view of part of transmitting selector at central.

Fig. 31 is a sectional view of the transmitting selector at central.

Fig. 32 shows part of the receiving selector at central in the operation of setting an element.

Fig. 33 shows part of the transmitter controlling member at the substation in the act of stepping to the next signal.

Fig. 34 is an electrical diagram of transmission from a substation to central and retransmission on a trunk line.

Fig. 35 is an electrical diagram of reception of signals from a trunk line and retransmission on a branch line and reception at the substation.

Fig. 36 is a diagram of a double multiplex distributed to two substations.

Fig. 37 shows the time intervals on a transmitting branch.

Fig. 38 shows the current corresponding to a signal composed of the BE combination on a transmitting branch.

Fig. 39 shows the time intervals on the trunk line.

Fig. 40 shows the current on the trunk line when no signals are being transmitted.

Fig. 41 shows the same signal as shown in Fig. 38 on the trunk line.

Fig. 42 shows the time intervals on the receiving branch line.

Fig. 43 shows the same signal as Fig. 41 on the receiving branch line.

Code.

The code used is a five unit code usually known as the Baudot code. Such a code is described in my U. S. Patent 1,229,202. On the trunk line reversed current is used, and the reversals of line current due to the code signals are used to keep in phase the apparatus at the two ends of the line. Different channels of the multiplex normally send to line different polarities so that even when no code signals are being transmitted, there are current reversals on the line for phase control. On the branch lines each code signal is preceded by a "start" impulse which acts to keep the apparatus at the end of the branch line in phase.

The transmitting apparatus (see Fig. 1) comprises a series of key levers 1 corresponding in number to the number of different code signals to be transmitted. Key levers 1 are pivoted at a point 2, and at their extreme ends 3, keys levers 1 move in slots in bar 4. In a hole in bar 4 above each key is a helical compression spring 5, pressing its upper end against lid 6 and its lower end against tip 3 of lever 1 and acting to return key lever 1 to normal after the finger has been removed from key tip 7. Above the ends of key levers 1 are mounted five bars $8^a$ to $8^e$ and a "start" bar 9. The bars $8^a$ to $8^e$ correspond to the five elements of the code and have cut on their under surface opposite each key lever a right sloping face 10 or a left sloping face 11 (see Fig. 5) according to whether or not that particular element enters into the corresponding signal. Bar 9, called the "start" bar has a left sloping face opposite each of the key levers 1 and is thrust to the left upon the depression of any key and returns as soon as the finger is removed from a key tip 7. The bars $8^a$ to $8^e$ and bar 9 are mounted for sliding motion at right angles to the direction of key levers 1. The bars $8^a$ to $8^e$ when the extreme left have their tips extending under the tips of a series of bell cranks $12^a$ to $12^e$ (see Fig. 9). When slides $8^a$ to $8^e$ are moved to the right their tips are removed from under the tips of bell cranks $12^a$ to $12^e$. The bell cranks $12^a$ to $12^e$ have a series of projections $13^a$ to $13^e$ (see Fig. 1) which normally rest against the high part of a cam 14 so that their tips just clear the tops of slide bars $8^a$ to $8^e$. Cam 14 is mounted rigidly on a shaft 15. On the outer end of shaft 15 is mounted a roller friction clutch (see Figs. 6, 7 and 8) comprising a drum 16 mounted for rotation on a round sleeve 17 fast to shaft 15. Drum 16 carries on its outer end spur gear 18 (see Fig. 27) which meshes with the train of gears 19, gear 20, gear 21 to pinion 22 mounted on shaft 23 of electric motor 24 (see Fig. 6). Electric motor 24 is in continuous operation and through the gears above mentioned keeps drum 16 in constant rotation. The gearing is such that the number of revolutions of drum 16 allows the operator to operate the keyboard as fast as she may desire. The speed may be made sufficiently fast to accommodate the most expert operators. Fast to sleeve 17 is an eccentric 25. Adjacent to eccentric 25 is a round sleeve 26 upon which is mounted a carrier arm 27 having projections 28 and 29 which extend into the space between drum 16 and eccentric 25 and carry roller 30. On the side of carrier 27 opposite projections 28 and 29 is a lug 31 adapted to engage tip 32 of bell crank 33 which is held into engagement therewith under tension of spring 34. A washer 34$^a$ on shaft 15 has a projection 34$^b$ which serves as an attachment for one end of spring 38. Washer 34$^a$ also has another projection 34$^c$ which serves to prevent the shaft 15 from overthrowing when the clutch is released. This is accomplished by projection 34$^c$ engaging one face of the carrier 31 which is in turn stopped by lug 32. The end of bell crank 33 rests on one end of another bell crank 35 pivoted about point 36. The other arm of bell crank 35 engages the tip 37 of start slide 9. When any key 1 is operated start slide 9 will be pushed to the left and through bell crank 35 will disengage the tip 32 of bell crank 33 from lug 31 and under tension of spring 38 carrier 27 will move roller 30 into the narrower portion of the space between eccentric 25 and drum 16 and thereby lock drum 16 to eccentric 25, and since drum 16 is rotating eccentric 25 will in turn rotate and carry with it shaft 15. When shaft 15 in its rotation carries cam 14 (see Fig. 1) to the position where the high part passes from under projections 13$^a$ and 13$^e$ on bell cranks 12$^a$ and 12$^e$ they will turn about their pivot 39 under tension of springs 40$^a$ and 40$^e$ and those bell cranks 12$^a$ and 12$^e$, which do not enter into the combination set by the particular key lever 1 depressed, will move only a short distance until their tips engage the tips of slide bars 8$^a$ to 8$^e$. Those bell cranks 12$^a$ to 12$^e$, however, which do enter into the particular combination will be permitted to move further. Their tips 41$^a$ to 41$^e$ in the latter case will strike the tops of corresponding cotter pins 42. The cotter pins 42 are mounted in successive groups of five, equally spaced around the circumference of a cylinder 43. Cylinder 43 is mounted on discs 44 adapted to turn on rods 45. By this arrangement cylinder 43 is free to rotate yet the space inside is perfectly clear for the transmitter control mechanism described later. Cylinder 43 has on its inner circumference a series of five circumferential grooves 46 (see Fig. 14). On the outer surface of cylinder 43 is a series of slots 47 parallel with the axis of cylinder 43 and just deep enough to meet the circumferential grooves on the inside of the cylinder. It will be noted that by this arrangement there will be successive groups of five square holes around the cylinder. Into each of these openings is placed a cotter pin 42. The cotter pins are spread and made of spring material so that they may be slid toward or away from the axis of cylinder 43 and will remain in the position in which they are placed. When the bell cranks 12$^a$ to 12$^e$ (see Fig. 1) have been allowed to operate as previously described their tips 41$^a$ to 41$^e$ will strike cotter pins 42 and will push them into their inner position in combination corresponding to the key 1 depressed. As shaft 15 continues to rotate cam 14 will return bell cranks 12$^a$ to 12$^e$ to their normal position. At the same time cam 48 (see Fig. 3) also mounted on shaft 15, will engage a projection 49 on lever 50, also pivoted about pin 39, and will cause its upper end 51, which extends completely across cylinder 43, to engage the inner ends of the row of cotter pins 52, which immediately precedes the row 42, and will push all five cotter pins in this row to their outer position ready to be set for the next signal.

When shaft 15 has completed about one-half revolution (see Fig. 7) lug 31 will engage projection 53 on bell crank 33, if the finger has not been removed from key tip 7, and thus stop the rotation of shaft 15. When the finger is removed from key tip 7, bell crank 33, under tension of spring 34, will move and release projection 53 from lug 31 and allow shaft 15 to continue its rotation. The action just described permits shaft 15 to make only one revolution no matter how long key 1 may be held down.

As shaft 15 continues its rotation after lug 31 passes projection 53 arm 50 will fall off the high part of cam 48 (see Fig. 3) and return to normal under tension of spring 54. At the same time (see Fig. 2) lever 55 will be engaged by the rising part of cam 56 and moved to the left. Lever 55 will carry with it pawl 57, which engages a tooth of ratchet wheel 58 under tension of spring 59. Ratchet wheel 58 is rigidly attached to cylinder 43 and has the same number of teeth as there are groups of cotter pins 42. As lever 55 is moved by cam 56 ratchet wheel 58 will be moved forward one space, so that the next row of cotter pins 52 will be in alignment with tips 41$^a$ to 41$^e$. Just as lug 31 (see Fig. 7) engages tip 32 of bell crank 33 arm 55 will fall off the high part of cam 56 (see Fig. 2) and under tension of spring 60, pawl 57 will move to the right and engage the next tooth of ratchet wheel 58, shaft 15 comes to rest, and all the parts have been returned to normal ready to start on another cycle for the next signal.

When cylinder 43 is advanced as just described it does so against the tension of a spring 61 (see Fig. 15), the function of which will be described later. When pawl 57 is moving to engage the next tooth in ratchet wheel 58 cylinder 43 is prevented from rotating backwards by means of holding pawl 62 which is pressed by spring 63 into engagement with ratchet wheel 58. By the continued operation of key levers 1 successive groups of cotter pins 42 will be set in combinations corresponding to the successive characters to be transmitted.

Having described the method by which cotter pins 42 are set according to the signals to be transmitted, the method by which these pins control the transmission of the signals will now be described. On the inside of cylinder 43 (see Fig. 14) a series of five levers $64^a$ to $64^e$ are pivoted on shoulder screws 65 on arm 66, the tip 67 of levers $64^a$ to $64^e$ (see Fig. 33) are normally in the space immediately to the left of the corresponding cotter pins 42. The opposite ends of levers $64^a$ to $64^e$ have ring formed ends 68 (see Fig. 1) which encircle a tube 69 rigidly mounted in frame 70. On the inside of tube 69 (see Fig. 15) are mounted five rods $71^a$ to $71^e$ adapted to move longitudinally and held to the left under tension of a series of springs 72. Each of the rods $71^a$ to $71^e$ has a pin 73 projecting through slots 74 in cylinder 69 in such a manner that they lie immediately adjacent to the right hand face of the ring shaped end 68 of the corresponding levers $64^a$ to $64^e$. Each of the levers $64^a$ to $64^e$ is under tension of a spring 75 which tends to keep the ring shaped end 68 against the corresponding pins 73 but does not have sufficient tension to overcome springs 72. When levers $64^a$ to $64^e$ are moved to the right, as later described, the tips $67^a$ to $67^e$ of those levers $64^a$ to $64^e$, which correspond to cotter pins 42 which have been set, will engage the set cotter pins and by the motion of their pivots 65 have the ring shaped ends 68 forced to the right and along with them the corresponding rods $71^a$ to $71^e$. Those levers $64^a$ to $64^e$, which correspond to cotter pins, which have not been set, will move in such a manner as not to move the corresponding rods $71^a$ to $71^e$. The function of the movement of rods $71^a$ to $71^e$ will be later described. Arm 66 is rigidly mounted on a shaft 76, which is mounted in supports 77 and 78 (see Fig. 15) for longitudinal motion, and is pressed to the right under tension of spring 79. The forked tip 80 of a lever 81, (see Fig. 16) pivoted about point 82, engages a groove 83 in the hub of arm 66. The other tip of lever 81 engages the end 84 of a bell crank 85, pivoted on shoulder screw 86. The other end of bell crank 85 carries a roller 87 which engages a cam 88 fast to a shaft 89. Shaft 89 is rotated once for each character to be transmitted by means to be later described. As shaft 89 is rotated the high part of cam 88 comes under roller 87, rotates bell crank 85, moves arm 81 about its pivot 82, and moves arm 66 to the left. Arm 66 has rigidly fastened to its right hand side a ratchet wheel 90, which has the same number of teeth as ratchet wheel 58. The teeth of ratchet wheel 90 normally engage a pawl 91 (see Figs. 1 and 4) rigidly mounted in a block 92 fast to cylinder 43. The tension of spring 61 (see Fig. 15) is conveyed through shaft 76, arm 66, ratchet wheel 90, pawl 91, block 92, to cylinder 43. When arm 66 and consequently ratchet wheel 90 are moved to the left ratchet wheel 90 will be disengaged from pawl 91 and will engage a pawl 93, which is mounted in a slot 94 in block 92 and is under tension of spring 95. When ratchet wheel 90 engages a pawl 93, spring 61 being stronger than spring 95, ratchet wheel 90 will move and compress spring 95. By this motion the next tooth of ratchet wheel 90 will be brought opposite pawl 91 and the tips $67^a$ to $67^e$ of levers $64^a$ to $64^e$ will be opposite the next row of cotter pins 42, and, as cam 88 (see Fig. 14) continues to rotate, roller 87 will fall off the high part of cam 88 and allow arm 66 and levers $64^a$ to $64^e$ to move to the right under tension of spring 79 and rods $71^a$ to $71^e$ will be set in a combination corresponding to the next row of cotter pins 42.

By the apparatus so far described it will be noted that as the shaft 89 is rotated ratchet 90 and arm 66 will move step by step and the rods $71^a$ to $71^e$ will assume successive combinations of positions corresponding to the setting of successive groups of cotter pins 42. The method by which the rods $71^a$ to $71^e$ control the transmission of the signals will now be described. Gear 20 (see Figs. 6, 14 and 18) is continuously rotated by motor 24. It carries on one side a cylinder 96. Cylinder 96 and gear 20 are mounted for rotation on ball bearing 97, the other race of which is fast to shaft 98. The inside surface of cylinder 96 has three longitudinal grooves 99 (see Figs. 10, 11 and 12) into which fit lugs 100 on a series of rings 101. Mounted on square shaft 96 for rotation therewith is a corresponding series of discs 102 which alternate with discs 101 and between each disc 101 and disc 102 is mounted a ring 103 free to rotate with either disc 101 and 102. The stack of discs 101, 102 and 103 are under tension of a compression spring 104. It will be noted that as gear 20 rotates due to the friction between the discs 101, 102 and 103 there will be tension on shaft 98 tending to rotate it. On shaft 98 are mounted two escapement wheels 105 and 106. Escapement wheels 105 and 106 (see Fig. 22) are engaged by pallets 107 and 108, respectively, on an anchor 109, which is pivoted about a point 110. The opposite end of anchor 109 is forked and is adapted to engage an impulse pin 111 fast to balance wheel 112. Fast to balance wheel 112 is "hair-spring" 113. The parts just described are the well known lever watch escapement in a modified form. The size of "hair-spring" 113 and balance wheel 112 are so chosen that one-half oscillation of balance wheel 112 corresponds to the time interval of one of the unit impulses which form the signal periods. Balance wheel 112 carries on its circumference a lug 114 (see Fig. 24) which, when no signals are being transmitted, engages, under tension of "hair-spring" 113, arm 115, which is pivoted about a point 116. Arm 115 carries a pin 117, which engages a link 118, the other end of which is pivoted about a point 119 to a slide 120, mounted in guides 121 and 122. Slide 120 is so mounted in guides 121 and 122 that it can move up and down and out at the lower end, but cannot move out at the upper end since it is held by lid 123. The upper end of slide 120 has sufficient play in guide 121 so that it can tilt in the guide without binding when it moves out at the bottom. Slide 120 and consequently arm 115 are held down under tension of a spring 124. When a signal is transmitted, as later described, which, by means later described, energizes magnet 125, which in turn attracts armature 126 against the tension of spring 127 and causes the tip of arm 128 to engage the lower end of slide 120, and move it upward and along with it link 118 and arm 115, thus releasing balance 112 and through the action of impulse pin 111 and anchor 109 and escapement wheels 105 and 106 shaft 98 will move step-by-step. Just after shaft 98 starts in motion, a cam 129 engages a projection 130 on bell crank 131, pivoted about a point 132, the forked end 133 of which engages pin 117 on arm 115. By the action of cam 129 and arm 131, arm 115 will be held out of engagement with lug 114, until a low part 134 is opposite projection 130, which will allow arm 115 to again engage lug 114. By the action of cam 129 shaft 98, having once started to rotate, must complete a half revolution before again stopping and will always be stopped at the end of the half revolution, until again started by the energizing of magnet 125. It is to be noted (Fig. 13) that escapement 105 has one tooth on each side missing, while escapement wheel 106 has corresponding open spaces filled in. These abnormal spaces are so arranged with respect to cam 129 that they come into action at the time that arm 115 engages the lug 114 to stop the operation of balance 112, so that after balance 112 stops, shaft 98 continues to rotate and causes the last step of shaft 98 to be longer than the others. The last step of shaft 98 is longer than the others to allow for an interval between the last element of the code and the start impulse of the next succeeding signal, in order to insure the locking of the balance at the end of a signal and that it shall start afresh at the beginning of the next signal. This long tooth performs the function of a more complicated arrangement described in my U. S. Patent 1,229,201.

As cam 129 rotates it also engages a lug 135, on slide 120 and moves its lower end to the left so that if the magnet 125 is energized continuously the lower end of slide 120 will not be over the tip of arm 128 and can move downward under tension of spring 124 and allow arm 115 to lock balance wheel 112 after lever 131 has been released by cam 129. This device makes possible the operation of a line according to the Morse closed circuit method. If the line is closed permanently shaft 98 will make one-half revolution and come to rest due to slide 120 having fallen down back of the projection on arm 128. If slide 120 did not move outward as described at the bottom, when the line was closed shaft 98 would continue to move until the line was again opened.

Shaft 98 carries five cams 136$^a$ to 136$^e$ (see Figs. 13, 17 and 18) which correspond to the five elements of the code and are spaced 22½ degrees apart or the angular distance through which shaft 98 moves during one swing of balance 112. There is also a similar cam 137, which corresponds to the start impulse and is 67½ degrees from the last code cam 136$^e$. Corresponding to the cams 136$^a$ to 136$^e$ is a series of levers 138$^a$ to 138$^e$ which are mounted in guides 139 and 140 and are free to move out at either the top or bottom but are prevented from moving in a vertical direction by a rod 141 which fits in a slot in the upper end of levers 138$^a$ to 138$^e$. Levers 138$^a$ to 138$^e$ are under tension at their upper ends of springs 142. Each of the levers 138$^a$ to 138$^e$ has a projection 143 adapted to be engaged by the corresponding cams 136$^a$ to 136$^e$. On the ends of the rods 71$^a$ to 71$^e$ (see Figs. 14 and 33), above described, are plates 144$^a$ to 144$^a$ so arranged that when they are in a position corresponding to a cotter pin 42, which has been pushed in, they are directly in front of the lower end of a corresponding lever 138$^a$ to 138$^e$. Plates 144$^a$ to 144$^e$ which correspond to cotter pins 42, which have not been operated, will not be in front of their corresponding levers 138$^a$ to 138$^e$. As cams 136$^a$ to 136$^e$ are rotated step-by-step, as previously described, they will successively and respectively engage corresponding levers 138$^a$ to 138$^e$ and will push out at their lower ends those levers which do not have opposite them a plate 144$^a$ to 144$^e$. Those levers, however, which have opposite their lower ends a plate 144$^a$ to 144$^e$ will be thrust outward at their upper end. It will be seen then that, as shaft 98 rotates, those levers 138$^a$ to 138$^e$, which correspond to set cotter pins, will be thrust outward at their upper ends, while those corresponding to unset cotter pins will not be so operated. Directly in front of levers 138ª to 138ᵉ is a universal bar 145, fast to plunger 146, mounted for longitudinal motion on support 147, which carries on its other end an insulating tip 148 which engages lever 149, held against insulating tip 148 by spring 150. Lever 149 carries a contact 151, which is attached to lever 149 by spring 152. Directly in front of contact 151 is an adjustable contact 153. Levers 138ª to 138ᵉ, through universal bar 145, plunger 146, insulating tip 148, and lever 149, will open and close contacts 151—153 in combinations, corresponding to the setting of the particular group of cotter pins concerned. The opening and closing of contacts 151—153 closes a circuit through magnet 125, in a manner to be later described.

The transmitting apparatus, so far described, has concerned itself only with the transmission of those impulses which make up the code proper. In the type of apparatus here described it is necessary to precede each group of code impulses by a so-called "start" impulse which acts to start the mechanism into operation for the transmission of each signal. The mechanism for performing this function will now be described. As previously stated, there is mounted on shaft 98 a cam 137 (see Figs. 19, 20 and 21), which is so mounted that, in the normal stopping position of shaft 98, it stops directly under projection 154 on a lever 155, which is similar to levers 138ª to 138ᵉ and is also adapted to engage universal bar 145. Mounted adjacent to lever 155 is an arm 156, which is pivoted about rod 141, and has at its lower end a lip 157, extending over the lower end of lever 155. At the lower end of lever 156 is a spring 158. We will assume that the mechanism is in the position shown in Figure 21 and that a hook 159 engages another lip 160 on lever 156, thus holding it to the right. Hook 159 is mounted for rotation on a shaft 161 and is under tension of a spring 162, which has a tendency to throw hook 159 into engagement with lip 160. Fast to shaft 161 is an arm 163, which is under tension of a spring 164 and tends to turn shaft 161 and, by the engagement of a pin 165 fast in shaft 161 with a pin 166 fast in hook 159, thereby lift hook 159 out of engagement with lip 160. Ratchet 90 carries a pin 167, which is so located that it will engage the tip of lever 163, and move it against tension of spring 164, and allow hook 159 to engage lip 160 when the signals corresponding to all the set cotter pins have been transmitted. If key levers 1 are operated, ratchet 90 will move to the position shown in Figure 20, arm 163 will move against stop 168 fast in sideframe 70, under tension of spring 164, lift hook 159 out of engagement with lip 160, allow lever 156 under tension of spring 158 to turn about rod 141, lip 157 will engage the lower end of lever 155 and rock it about cam 137 as a fulcrum, operate universal bar 145, and in turn close contacts 151—153 as previously described. The closing of contacts 151—153 will close the circuit of magnet 125 in a manner to be later described, will operate the start mechanism shown in Figure 24 and previously described, and so start into motion shaft 98. After shaft 98 has moved a short distance the projection on lever 155 will fall off the high part of cam 137 and will allow contacts 151—153 to open unless the A code impulse is to be transmitted. In which case the circuit will remain closed by the operation of cam 136ª as previously described, and as shaft 98 continues to rotate, contacts 151—153 will be operated in combination corresponding to the signal to be transmitted. Shaft 98 carries another cam 169, having a high part 170, which engages a high part 171 on lever 156 at the beginning of the long step of shaft 98, previously referred to, and rotates lever 156 about rod 141 and moves it far enough for hook 159 to engage projection 160, in case pin 167 is engaging arm 163. If, however, pin 167 does not engage arm 163, hook 159 will be held out of engagement with lip 160 and just as shaft 98 comes to rest projection 171 will fall off the high part 170 of cam 169, and contacts 151—153 will be again closed to send the "start impulse" for the next signal. By the mechanism just described, the transmitting mechanism and also the timing mechanism are allowed to operate according to whether signals are stored on cylinder 43 or not. How this is done will be understood from the description of the operation given later.

Mounted on shaft 98 is another cam 172 (see Fig. 26) having high part 173, which operates lever 174, just before shaft 98 comes to rest. Lever 174 is pivoted about a point 175, and engages at its other end bell crank 176, whose other arm 177, under tension of a spring 179, is adapted to engage a lug 178, on a roller carrier 180, which is similar in every respect to roller carrier 27 previously described. (See Fig. 25). Corresponding to roller carrier 180 is a drum 181, eccentric 182, spring 183, all similar to the corresponding parts of the roller clutch shown in Figures 7 and 8. When arm 174 is operated by projection 173, just as shaft 98 comes to rest, tip 177 is disengaged from lug 178 and drum 181, through roller 184, is locked to eccentric 182, since drum 181 is fast to a gear 185, which is meshed with gear 21 and is therefore rotating continuously, shaft 89, which carries cam 88, will be set in motion (see Fig. 14). The functions performed by the operation of shaft 89 has been previously described in detail. By the mechanism, just described, each time shaft 98 rotates and just before it comes to rest, shaft 89 will be started into rotation and will make one revolution. In so doing cam 88 will engage roller 87 and through lever 85 rock lever 81, and in turn give arm 66 an out and in motion and thereby will cause levers $12^a$ to $12^e$ to engage the next succeeding set of cotter pins 42 and set plates $144^a$ to $144^e$ in the proper combination to transmit the next signal. It will be seen then, that the arm 66 will automatically engage succeeding groups of cotter pins, set plates $144^a$ to $144^e$ according to the succeeding combinations and will close contacts 151—153 in combinations corresponding to the combinations of cotter pins set.

In order to explain more clearly the successive operations as the machine is used we shall assume that the machine starts with no characters stored in the cylinder 43. When in such a state the arm 66 will be in such a position that the tips of the levers $64^a$ to $64^e$ will be opposite the row of cotter pins $42^a$ and at the same time pin 167 will engage arm 163 and hook 159 will engage projection 160 as shown in Fig. 21 and lever 156 will be prevented from operating so that contacts 151—153 will be open. If a key 7 is depressed the row of cotter pins 42 (Fig. 1) will be set as previously described, in a combination corresponding to the key depressed, and the cylinder 43 will be spaced, also as previously described, so that the row of cotter pins 42 (Fig. 1) will occupy the position previously occupied by the cotter pins $42^a$. When the cylinder 43 is spaced in a right hand direction (Fig. 1) ratchet wheel 90, through pawl 91, is carried in the same direction and along with it the arms $64^a$ to $64^e$ so that they will now occupy a position corresponding to the position $42^b$ in Fig. 1. When ratchet wheel 90 is carried forward as described in the previous sentence, pin 167 in Fig. 20 is moved in clock-wise direction and allows arm 163 to move so as to remove hook 159 from projection 160, allow lever 155 to operate and to send a start impulse followed by a code impulse corresponding to the cotter pins set and in the manner previously described. The ratchet wheel 90 will be spaced in a counter clockwise direction one tooth by the cam 88 and arm 85, as previously described, and if no other key is depressed the machine will return to the state described at the beginning of this paragraph. It will be seen that if no characters are stored in the cylinder and a key is depressed the corresponding signal will be immediately transmitted just as though the keyboard was a direct transmitter.

If, however, immediately after the key 7 has been depressed and before the corresponding signal has been transmitted another key is depressed the corresponding row of cotter pins will be set, the cylinder 43 will be spaced in a clockwise direction one space and along with it ratchet wheel 90 and arms $64^a$ to $64^e$. At the same time the transmission of the character corresponding to the first key depressed will be transmitted and ratchet wheel 90 and arms $64^a$ to $64^e$ will be allowed to move backward with respect to cylinder 43 one space after the transmission of each character. As the operation of the machine proceeds the depression of succeeding keys will advance cylinder 43 and arms $64^a$ to $64^e$ step by step in a clockwise direction at a certain rate and at the same time the transmission of succeeding characters will proceed and the arms $64^a$ to $64^e$ will be moved in a counter clockwise direction with respect to cylinder 43 at a rate depending upon the rate of the balance wheel 112. If the operator is working at a greater rate than the rate of transmission the cylinder 43 and arms $64^a$ to $64^e$ will be moved in a clockwise direction at a rate which is equal to the difference between the rate of the operator and the rate of transmission. If the operator stops or goes at a rate slower than the rate of transmission arms $64^a$ to $64^e$ will move in a counter clockwise direction with respect to cylinder 43. If the operation of the keyboard is stopped entirely arms $64^a$ to $64^e$ will continue to move in a counter clockwise direction with respect to cylinder 43 until all the characters are transmitted and all the parts are returned to the position indicated at the beginning of the preceding chapter.

The natural tendency of a keyboard operator is to depress a few keys in very rapid succession and other keys at a much slower rate and at times to stop altogether. Such a method of operation with the device here described will not interfere with the most efficient use of the wire, will store up characters at a rate faster than the rate of transmission which will compensate for the times she will operate at a slower rate or stop altogether.

At sub-station X (see Fig. 34) the motion of shaft 98 is timed by the balance and escapement above described. The apparatus at central which receives these signals has a shaft 186 which is provided with a balance and escapement identically like that shown in Figure 22, and also a "start" mechanism identically like that shown in Figure 24 and is started into operation by the "start" impulse which operates magnet 187 simultaneously with the starting of the shaft 98 at substation X. The balance and escapements at the two stations serve to time the individual impulses forming the signals and the operation of the individual elements of the receiving apparatus, and the "start" impulse performs the function of starting the two apparatuses in the same phase position at the beginning of each signal.

The apparatus on the trunk line is continuously synchronized. At station M there is a motor 188 carrying an insulated brush arm 189, upon which are mounted two trailer brushes 190 and 191. There is also provided a tuning fork 192, between whose prongs is mounted a magnet 193, the tuning fork carries a plate 194, which oscillates between the two contacts 195 and 196, which in turn are connected to alternate segments of segmented ring 197. The tuning fork is kept in vibration by magnet 193, whose circuit may be traced as follows: positive, through resistance 198, magnet 193, contact 199, plate 194, to negative. Magnet 193 attracts the prongs of tuning fork 192, breaks the circuit at contact 199, allows the prongs to return, and, by continued repetition of the same operations, keeps the fork in continuous vibration. While the tuning fork 192 is oscillating between contacts 195 and 196, motor 188 is driving trailer brushes 190 and 191 over segmented ring 197 and collecting ring 200, and opening and closing a shunt circuit around resistance 201 at rapidly recurring intervals, so that motor 188 will receive a variable amount of current, depending upon the phase position of the tuning fork and of the rotating trailer brush 190 with respect to segmented ring 197. The period of vibration of the fork 192 is so chosen that motor 188, when in synchronism with the fork, will drive trailer brush 190 from the middle of one segment to the midlle of the next segment on commutator 197 in the time of one-half vibration of fork 192.

At central M¹ (see Fig. 35), for driving the devices which receive the signals from central M, there is a motor 202, tuning fork 203, commutator 204, brush arm 205, all corresponding to similar parts at central M and performs similar functions. The tuning fork 203, however, at station M¹, does not vibrate at its natural period, which is as closely as possible like that of fork 192, but its vibrations are forced by impulses generated from the reversals of the line current. The signals sent out from station M, as later described, keep in vibration main line relay 206. Tongue 207 vibrates between two contacts 208 and 209 which connect, respectively, to plus and minus, through resistances 210 and 211 and also to one terminal of two condensers 212 and 213. The other terminals of condensers 212 and 213 are connected together and to one terminal of tuning fork magnet 214, the other terminal of which connects to tongue 207. At each reversal of the line current the condensers 212 and 213 will discharge through magnet 214 and give it a vibrating impulse. As in the case of the apparatus at central M, brush arm 205 will rotate in phase with the vibrations of tuning fork 203, and due to the fact that tuning fork 203 is vibrated by impulses sent out from central M it will be in phase with tuning fork 192 and therefore brush arms 189 and 205 will rotate in synchronism. The operation of this synchronizing device is more fully described in my U. S. Patent 1,201,621.

For each revolution of brush arm 258 ten impulses are sent to line. Five of these impulses are used for the transmission here described, the remaining five could be used for transmission from another substation, for example, substation Y in Fig. 36. The segmented rings 197 and 204 have twenty segments, or twice as many as the number of impulses sent out on the line during one revolution. This is necessary in order that tuning fork 203 may be in the same phase position each time the line current is reversed. The reason for this is more fully explained in my said U. S. Patent No. 1,201,621. The normal current sent out on the line when no code signals are being sent is plus for one quadrant and minus for the other quadrant. The normal current is shown in Fig. 40. All the curves show the current for a period corresponding to the time for two revolutions of the distributors. By this means there are always reversals on the line to maintain the synchronism, otherwise synchronism would be lost if, for any considerable interval, no signals were transmitted.

In my co-pending application, Serial No. 286,540, I have shown a method for the operation of substations by a non-synchronous method and the trunk line by a synchronous method, in which it is necessary that there shall be a definite relation between the timing device (balance and escapement in this case) of the apparatus at the substation for operation over the branch line and the timing device (tuning fork in this case) of the apparatus at the central station for operation over the trunk line. In the present case no such relation is essential. It is only necessary that the apparatus operating over the branch line shall be adapted to operate at least as fast as the apparatus on the trunk line. It can be any amount faster without interfering with the operation. The rate of transmission of the signals (number per minute) over the branch line is, however, determined by the apparatus on the trunk line.

At central M¹ shaft 215 has a balance and escapement and a start mechanism similar to that shown in Figures 22 and 24, and a magnet 216 which corresponds in its function to magnet 125 at substation X. At substation X¹ there is similarly a shaft 217, which also has a balance and escapement, and start mechanism similar to that in Figures 22 and 24 to time the operation of shaft 217, and a magnet 218 similar to magnet 125, which start shaft 217 into operation.

The timing of the various parts of the mechanism at the different stations having been described, the description will again be taken up at substation X. At substation X magnet 125 has one terminal connected through resistance 219 to positive and the other terminal to forward contact 220 of neutral relay 221, the tongue 222 of which is connected to negative. Magnet 223 of relay 221 has one terminal connected to ground, the other terminal connected to contact 151. Contact 153 connects to branch line 224 which connects to one terminal of magnet 225 of neutral relay 226 located at central M. The other terminal of magnet 225 connects through contacts, to be later described, to resistance 227 to the positive pole of generator 228, the other pole of which connects to ground. Assuming the contacts at station M in line 224, which have not yet been described, to be closed, the initial closing of contacts 151—153 by the start impulse mechanism at substation X, already described and shown in Figures 20 and 21, energize magnet 223, closes contacts 220—222, energizes magnet 125, starts in motion shaft 98, and, as shaft 98 rotates step-by-step, line 224 will be closed through contacts 151—153 in combinations corresponding to the combination of cotter pins 42 which at that time engage levers $64^a$ to $64^e$. At the same time contacts 229 and 230 of relay 226 will close. The closing of contacts 229—230 will close a circuit as follows: from positive to resistance 231, magnet 187, contact 229, tongue 230, to negative. Armature 232 will be operated and shaft 186 will be started into operation simultaneously with shaft 98 at substation X and timed by the mechanism previously referred to. Shaft 186 carries a series of cams $233^a$ to $233^e$ similar to cams $234^a$ to $234^e$ on shaft 98 (see Fig. 13), and likewise spaced $22\frac{1}{2}$ degrees apart. The series of cams $234^a$ to $234^e$ have been shown as on shaft 98 in Fig. 13 to show their relation to other cams, though they are not shown as used at substation X. It is usual, however, in all the machines to include both sending and receiving cams. The receiving cams on a sending machine are frequently used to make a home record. It will be noted that these cams are pointed, while cams $136^a$ to $136^e$ have considerable face. This is done in order that the receiving cams shall use only central or good portions of the received impulses and thus increase the margin of operation as more fully explained in my U. S. patent application No. 66,830.

(Refer to Figs. 28, 29 and 32). Opposite each of the cams $233^a$ to $233^e$ is a slide $235^a$ to $235^e$ mounted in guides 236 and 237 so that they may move out at either the top or bottom, but are prevented from vertical motion by stationary rod 238 which fits in a slot in the upper end of levers $235^a$ to $235^e$. Levers $235^a$ to $235^e$ are held in place by individual springs 239. As shaft 186 rotates step-by-step levers $235^a$ to $235^e$ are thrust out in succession, and if, at the moment when they are thrust outward, the pointed tips 240 of armature 232 are down or below pointed projections 241 on levers $235^a$ to $235^e$ levers $235^a$ to $235^e$ will be pushed out at the bottom and will return immediately to their normal position, after cams $233^a$ to $233^e$ pass from under projections 242. If, however, when cams $233^a$ to $233^e$ thrust levers $235^a$ to $235^e$ outward magnet 187 is energized, pointed projections 240 are above tip 241, levers $235^a$ to $235^e$ are prevented from moving out at the bottom and will move out at the top against tension of spring 239. When levers $235^a$ to $235^e$ move outward at the top, plungers 244 are thrust upward by springs 245 and engage notches 246 (see Fig. 32) in the upper ends of levers $235^a$ to $235^e$, and lock levers $235^a$ to $235^e$ in their outward position. Levers $235^a$ to $235^e$ carry on their upper ends insulating projections 247 which engage contact springs $248^a$ to $248^e$. When levers $235^a$ to $235^e$ are in their back positions contacts $248^a$ to $248^e$ will engage contacts $249^a$ to $249^e$. If, however, levers $235^a$ to $235^e$ are in their outward positions contacts $248^a$ to $248^e$ will make contact with contact springs $250^a$ to $250^e$.

As shaft 186 rotates, levers $235^a$ to $235^e$, and in consequence contact springs $248^a$ to $248^e$ will be operated and set in a position corresponding to the code signal received by relay 226. All of the back contacts $249^a$ to $249^e$ are connected together and through resistance 251 (see Fig. 34) to the positive pole of generator 252, the other pole of which is connected to ground. All of the front contacts $250^a$ to $250^e$ are connected together and through a resistance 253 to negative pole of generator 254, the other pole of which is connected to ground. Movable contacts $248^a$ to $248^e$ are connected to segments $255^a$ to $255^e$ of segmented ring 256 upon which bears trailer brush 257, carried by arm 258, which is fast to but insulated from arm 189, arm 258 carries another trailer brush 259 which bears on collecting ring 260. Collecting ring 260 is connected to main line 261. As brush arm 258 is rotated by motor 188 positive or negative current will be transmitted from generator 252 or 254 through resistance 251 or 253, tongues $248^a$ to $248^e$, segments $255^a$ to $255^e$, trailer 257, arm 258, trailer 259, collecting ring 260, main line 261, main line relay 206, main line relay 262, to ground. By the operation of the apparatus so far described, relays 206 and 262 will be operated in code combinations corresponding to the combination of cotter pins 42 engaging levers $64^a$ to $64^e$.

The signal corresponding to the setting of contact springs $248^a$ to $248^e$, having been transmitted, it is necessary to return levers 235ª to 235ᵉ to their normal position ready for the reception of the next code signal. The mechanism for accomplishing this will now be described. Extending immediately above all the plungers 244 is one arm of a bell crank 263, pivoted about a point 264. Mounted adjacent to the other arm and adapted to operate it is a magnet 265. The circuit of magnet 265 may be traced as follows: positive, resistance 266, magnet 265, contact 267, tongue 268 of neutral relay 269 to negative. The circuit of the coil of relay 269 may be traced as follows: positive, resistance 270, coil of neutral relay 271 (the function of this relay will be described later), coil of neutral relay 269, segment 272 of segmented ring 273, trailer brush 274, brush arm 275, which is rigidly fastened to but insulated from brush arm 189, trailer brush 276, collecting ring 277 to negative. It will be noted that, by this arrangement, just after trailer brush 257 has passed segment 255ᵉ and consequently transmitted the last impulse of the signal, the above circuit will be completed, magnet 265 will be energized, bell crank 263 operated, and all of the levers 235ª to 235ᵉ returned to their normal position ready for the next signal.

When describing the transmission from substation X it was assumed that the line at M was closed permanently. This, however, is not the case. It is necessary that the apparatus at substation X shall start with a definite phase relation with respect to the receiving apparatus at M. This is accomplished by keeping the circuit at M open and not allowing the "start" impulse to be sent until the proper phase position is reached. The apparatus for accomplishing this will now be described. The tongue 278 and forward contact 279 of relay 271 are connected respectively to contacts 280 and 281 and are both connected in series in line 224 so that either one may close the line. By the closing of the circuit above described, just after the E impulse has been transmitted on the trunk line, relay 271 is operated and line 224 is closed through contacts 278 and 279, and, if the line is also closed at the substation X, shafts 98 and 186 will both be started in motion for the transmission and reception of a signal on line 224. If, however, the line is open at substation X neither shaft will be started in motion. Even when contacts 151 and 153 at substation X are closed, the apparatus at neither station will start until trailer brush 274 reaches segment 272. By this means a definite phase relation will always be maintained between the apparatus on branch line 224 and that on trunk line 261. Just after shaft 186 is started in motion, as described, a cam 282 will operate lever 283, which in turn through insulating tip 284 will close contacts 280 and 281 and will maintain branch line 224 closed at station M until the complete signal has been received. It will be noted that there is a connection tapped to a point between coils of neutral relays 269 and 271 and connected to segment 285 immediately following segment 272. This connection causes relay 271 to close its contact longer than relay 269 and insures contacts 278—279 staying closed until contacts 280—281 close.

The signals transmitted on line 261 operate relay 262 and move tongue 286 between contacts 287 and 288 upon the reversal of the current in line 261. Contacts 287 and 288 connect to points 289 and 290 on resistance 291, bridged between the positive and negative direct current terminals. Point 292 midway between 289 and 290 connects to one terminal of a coil of polarized relay 293, the other coil terminal of polarized relay 293 connects to one terminal of each of a series of relays 294ª to 294ᵉ, the other terminals of the relays 294ª to 294ᵉ connect to five consecutive segments 295ª to 295ᵉ on segmented ring 296. A trailer brush 297 rides on segmented ring 296, and is carried by brush arm 298, which is fast to but insulated from brush arm 205. Brush arm 298 carries another trailer brush 299, which rides on collecting ring 300, connected to tongue 286 of relay 262. As brush arm 298 rotates in step with transmitting brush arm 258 at station M, impulses will be transmitted through the relays 294ª to 294ᵉ, according to whether positive or negative impulses are transmitted on line 261. If positive or normal impulses are transmitted, tongues 301ª to 301ᵉ will receive impulses toward their back stops and any relay corresponding to a negative impulse on line 261 will receive an impulse toward its front stop, so that the relays 294ª to 294ᵉ will have their tongues set according to the impulses transmitted on line 261. If all of the relays 294ª to 294ᵉ receive normal or positive impulses, relay 293 will have its tongue 302 pulled toward its back stop. If, however, any of the relays 294ª to 294ᵉ receive a negative or setting impulse, tongue 302 will be moved to its front stop 303. Relay 293 serves to control the "start" impulse. An additional polarized relay 293ª is provided to control the "start" impulse. If relay 293 is moved against its forward contact by A, B, C or D impulse and the E impulse is normal the tongue of relay 293 will be carried to its back stop. Relay 293ª serves the purpose of storing up any forward impulse received by relay 293 until it has performed its function. The forward coil of relay 293ª has one terminal connected through resistance 293ᵇ to positive and its other terminal to forward contact 303 of relay 293. Tongue 302 of relay 293 is connected to negative. When relay 293 receives an impulse to throw its tongue against its forward contact 303 an impulse is transmitted to relay 293$^a$ through a circuit traced as follows: positive supply main resistance 293$^b$, forward coil of relay 293$^a$, contact 303, tongue 302 to negative. Tongue 293$^c$ is thrown against forward contact 293$^d$ and completes a circuit described below.

The impulses cannot be transmitted directly from the contacts of relays 294$^a$ to 294$^e$, since it is not possible to get such a relation between the receiving and transmitting sunflowers that the transmission will not be interfered with by the setting of the relays for the next signal. There is provided therefore an auxiliary set of polarized relays 304$^a$ to 304$^e$ and an auxiliary start polarized relay 305. The tongues of the relays 294$^a$ to 294$^e$ are connected to the common wire of the forward and back coils of the auxiliary relays 304$^b$ to 304$^e$ and the common terminal of the forward and back coils of relay 304$^a$ is connected to one terminal of the forward coil of relay 305. The remaining terminals of the forward and back coils of relay 304$^a$ to 304$^e$ are connected to the forward and back contacts 306$^a$ to 306$^e$, and 307$^a$ to 307$^e$, respectively, of relays 294$^a$ to 294$^e$. Just after the E primary relay 294$^e$ has received its impulse, an impulse is transmitted to the auxiliary relays through a circuit traced as follows: positive supply main, resistance 308, tongue 301$^e$, contact 306$^e$ or 307$^e$, back or forward coil of relay 304$^e$, depending upon whether a normal or setting impulse is transmitted for the E element, tongue 306$^d$, and in a similar manner through the remaining relays 304$^d$ to 304$^a$, forward coil of relay 305, contact 293$^d$, tongue 293$^c$, segment 309, trailer brush 310, brush arm 311, trailer brush 312, collecting ring 313, to negative. An impulse will be transmitted through the above circuit only when code impulses are transmitted on line 261 and the impulse will immediately follow the E impulse on line 261. Whenever all the impulses transmitted on line 261 are normal, relays 293 and 293$^a$ will not be operated and consequently the above described circuit will be open. The relays 304$^a$ to 304$^e$ will remain set corresponding to the combination of the last character transmitted and relay 305 will not be operated.

The relays 294$^a$ to 294$^e$ are operated in succession, while the relays 304$^a$ to 304$^e$ are by a single impulse set in combination corresponding to the combination of relays 294$^a$ to 294$^e$ set. It will be noted that there are no parallel connections and that each relay receives a definite impulse to return it to normal or to set it, so that there is required only one contact on the distributor and the relays 304$^a$ to 304$^e$ are set the maximum length of time. The relays 304$^a$ to 304$^e$ are sometimes called "overlap relays" in that they allow a combination to remain set while the next signal is being received. This arrangement gives the maximum overlap.

Shaft 215 carries a series of transmitting cams 314$^a$ to 314$^e$ (see Figs. 30 and 31) similar in every respect to the cams 136$^a$ to 136$^e$ on shaft 98 at station X. Corresponding to each of the cams 314$^a$ to 314$^e$ and mounted in guides 315 and 316 is a series of levers 317$^a$ to 317$^e$ corresponding exactly to the series of levers 138$^a$ to 138$^e$. Levers 317$^a$ to 317$^e$, however, instead of operating a universal bar, each individually operate through insulating tips 318, contacts 319$^a$ to 319$^e$ and 320$^a$ to 320$^e$. There is also a lever 321, which corresponds exactly to start lever 155, and a pair of contacts 322 and 323 operate thereby. Levers 321 and 317$^a$ to 317$^e$, however, differ from the corresponding levers 155 and 138$^a$ to 138$^e$ in that they are permanently prevented from moving at their lower ends by rod 324, so that the contacts 319$^a$ to 319$^e$ are all operated in succession whenever shaft 215 is rotated and contacts 322—323 are always closed in the normal stopping position of shaft 215.

Whenever relay 305 is thrown against its forward stop a circuit may be traced as follows: positive terminal of generator 325, resistance 326, contact 322, contact 323, contact 327, tongue 328, coil of relay 329, branch line 330, neutral relay 331, to ground. The energizing of the coil of relay 329 throws tongue 332 against its forward stop 333 and completes a circuit as follows: positive terminal, resistance 334, magnet 216, contact 333, tongue 332 to negative. The energizing of magnet 216 operates its corresponding start mechanism, as previously described, and starts shaft 215 in motion and, as it moves, impulses will be transmitted on line 330 from positive terminal of generator 325, through resistance 326, contacts 319$^a$ to 319$^e$ and 320$^a$ to 320$^e$, contacts 335$^a$ to 335$^e$, tongues 336$^a$ to 336$^e$, depending upon whether or not the particular impulse is to be transmitted.

It will be observed that all the relays 293, 294$^a$ to 294$^e$ and 304$^a$ to 304$^e$ receive impulses at every revolution of brush arms 298 and 311 which set them or return them to normal so that no special arrangement is necessary for returning them to normal. Relays 305 and 293$^a$, however, are not so returned. They receive a returning to normal impulse as follows: positive supply source, resistance 337, normal coil of relay 305, normal coil of relay 293$^a$, segment 338, trailer brush 310, arm 311, trailer brush 312, collecting ring 313 to negative. Segment 338 is located just ahead of the A impulse segment.

It will be noted that on line 261 only the code impulses proper were transmitted, while on line 330 each group of code impulses is preceded by a "start" impulse under control of relays 293 and 305.

The impulses transmitted over line 330 operate relay 331 and close a circuit as follows: positive supply source resistance 339, magnet 218, contact 340, tongue 341, to negative. The energization of magnet 218 operates the start mechanism corresponding thereto, starts shaft 217 in motion and sets in combinations, corresponding to the signal transmitted, a series of levers 342$^a$ to 342$^e$, which are identical in construction with levers 235$^a$ to 235$^e$. Levers 342$^a$ to 342$^e$ may be the series of levers 106$^a$ to 106$^e$ shown in my co-pending U. S. patent application No. 66830. In my said application a method is shown by which the levers 106$^a$ to 106$^e$ may control a page printing mechanism, a page or tape perforating mechanism. They may of course not be confined in their use to such a recording device, but may be used to control any mechanism selectively.

In the circuit of relays 269 and 271 is a switch 343 which is used to stop the operation of the transmitter at substation X from central M. This switch will stop the transmission between signals so that no signals are mutilated.

Having described a specific embodiment of my invention, I do not wish to be understood as limiting myself to that construction.

What I claim is:

1. In a telegraph transmitter, a reciprocating support, a plurality of switch control elements mounted on said support, and permutation elements selectively movable into the paths of respective ones of said control elements to cause a displacement thereof relative to said support.

2. In a telegraph transmitter, a reciprocating support, a plurality of switch control elements mounted on said support, permutation elements selectively movable into the paths of respective ones of said control elements to cause a displacement thereof relative to said support, a single transmitting contact, and means sequentially operative under the control of said control elements for actuating said transmitting contact.

3. In a telegraph transmitter, a reciprocating support, a set of switch control elements mounted on said support, a corresponding set of permutation elements simultaneously movable in selected combinations into the paths of respective ones of said control elements to cause a displacement thereof relative to said support, a single transmitting contact, and means sequentially operative under the control of said control elements for actuating said transmitting contact.

4. In a transmitting device, a transmitting switch, a cam shaft, a series of cams mounted on said shaft and arranged to be brought successively into operative relation with said switch, a series of permutation elements for determining what combination of cams shall operate said switch, a storage member, means for storing a plurality of signals in said storage member, and means mounted on said cam shaft operating mechanically to set said permutation elements simultaneously for each of the successive signals stored in said storage member.

5. A storage transmitter comprising a cylinder revoluble about its axis, a set of permutation elements mounted in said cylinder and movable radially with respect thereto, means for displacing said elements selectively in various combinations depending upon the signal to be transmitted, a corresponding set of switch control levers arranged for independent rotation with respect to said cylinder, and means for shifting said levers laterally in the direction of the axis of said cylinder to bring said levers into engagement with said selected permutation elements whereby said levers are selectively actuated.

6. A storage transmitter comprising a cylinder revoluble about its axis, a series of permutation elements mounted in said cylinder and movable radially with respect thereto, means for displacing said elements selectively in various combinations depending upon the signal to be transmitted, a corresponding set of switch control levers arranged for independent rotation with respect to said cylinder, and means for shifting said set of levers laterally in the direction of the axis of said cylinder to bring said levers into engagement with said selected permutation elements whereby said levers are selectively actuated.

7. A storage transmitter comprising a cylinder revoluble about it axis, a plurality of sets of permutation pins arranged in transverse rows located around the periphery of said cylinder and independently movably radially with respect thereto, a set of permutation controlling elements located outside said cylinder and arranged to depress the pins of a set selectively in various combinations depending upon the signal to be transmitted by that set, means to rotate said cylinder step-by-step to bring said sets of pins successively under the control of said controlling elements, a corresponding set of switch control levers mounted within said cylinder and arranged for independent rotation with respect thereto, and means for shifting said levers laterally in the direction of the axis of said cylinder to bring said levers into engagement with the depressed pins of a set whereby said levers are selectively actuated in a corresponding combination.

8. A storage transmitter comprising a cylinder revoluble about its axis, a plurality of sets of permutation pins arranged in transverse rows located around the periphery of said cylinder, a set of permutation controlling elements located outside said cylinder and arranged to depress the pins of a set selectively in various combinations depending upon the signal to be transmitted by that set, means to rotate said cylinder step-by-step to bring said sets of pins successively under the control of said controlling elements whereby a plurality of signals may be stored for future transmission, a transmitting mechanism, a set of switch control members rotating step-by-step within said cylinder under the control of said transmitting mechanism and cooperating successively with said permutation elements to cause said transmitting mechanism to transmit the signal combinations stored thereby, and means operating automatically when all the stored signals have been transmitted to stop said transmitting mechanism.

9. In a storage transmitter, a cylinder, a series of groups of slidable members mounted in said cylinder, a carrier mounted for rotation about the axis of said cylinder, a series of levers mounted on said carrier and movable in a direction parallel with the axis of the carrier but perpendicular to the direction of motion of the slidable members, means to move said carrier to bring said levers into operative relation with successive groups of said slidable members, means to set said members in combination according to the signal to be transmitted and means controlled by said levers to transmit the signals.

10. In a storage transmitter, a cylinder revoluble about its axis, a series of permutation elements mounted in said cylinder, means to move said elements toward or away from the axis of said cylinder in a radial direction in combinations to represent the signals to be transmitted, and means movable in a direction perpendicular to the direction of motion of the permutation elements when setting to transmit the signals so stored.

11. In a machine telegraph, a signal storage member, a series of groups of movable elements mounted in said storage member, means to set said elements to represent the signal to be stored, said movable elements comprising a piece of spring material bent upon itself and placed in an opening so that the tendency of the material to open the bend holds the element in position where it is moved by said setting means.

12. In a machine telegraph, a series of groups of mechanical elements, a member having a series of parallel grooves in one face, and a second series of parallel grooves in the opposite face, the two said series of grooves being so cut that the bottom of one set crosses the bottom of the other set substantially at right angles and thereby makes an opening in which said mechanical elements are held.

In testimony whereof I affix my signature.

LOUIS M. POTTS.